Oct. 17, 1944.　　　E. E. ENGLUND　　　2,360,319
SEED PLANTER
Original Filed Dec. 26, 1941　　4 Sheets-Sheet 1

INVENTOR.
ERNST E. ENGLUND
by
ATTORNEYS

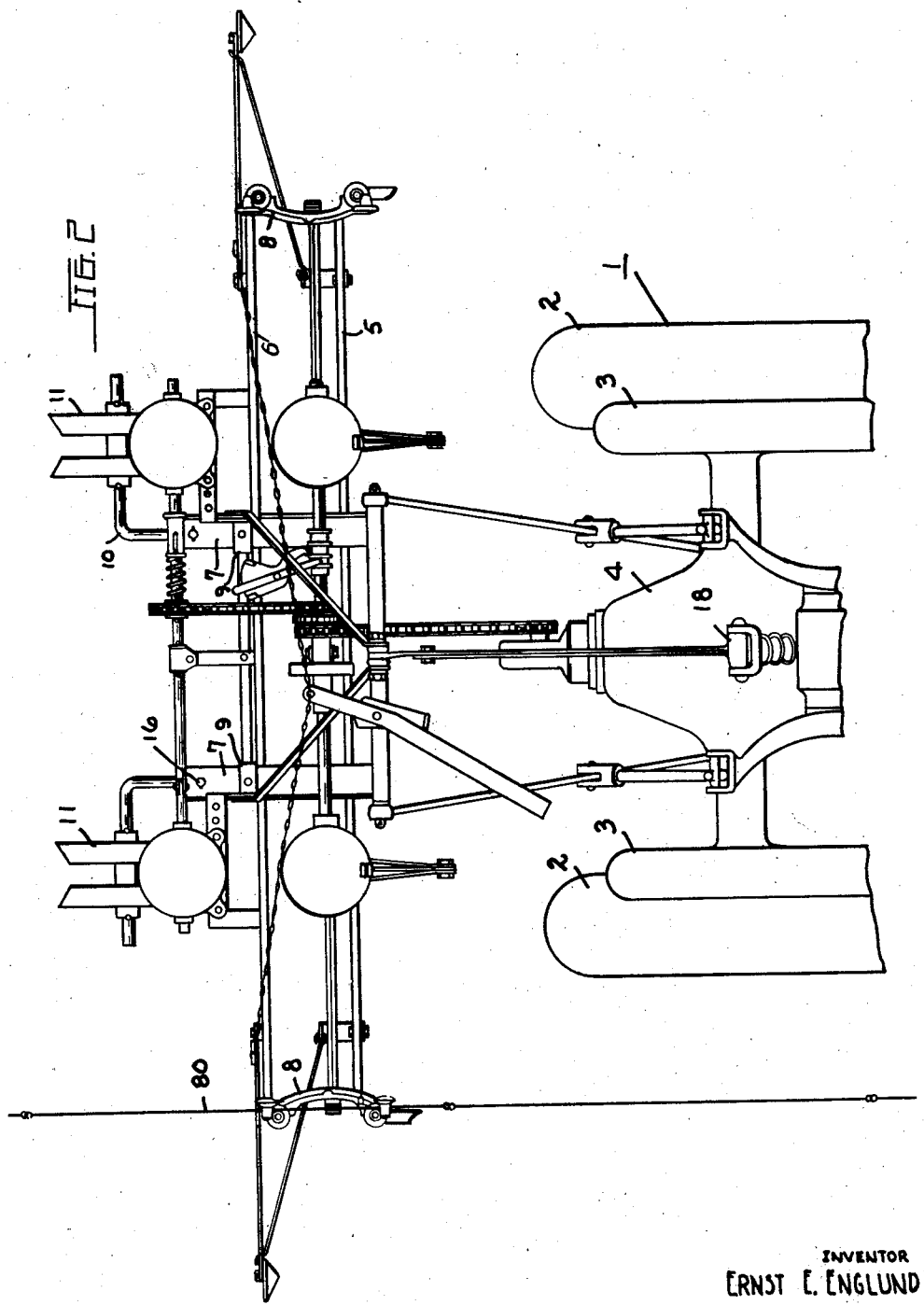

Oct. 17, 1944.  E. E. ENGLUND  2,360,319
SEED PLANTER
Original Filed Dec. 26, 1941   4 Sheets-Sheet 3
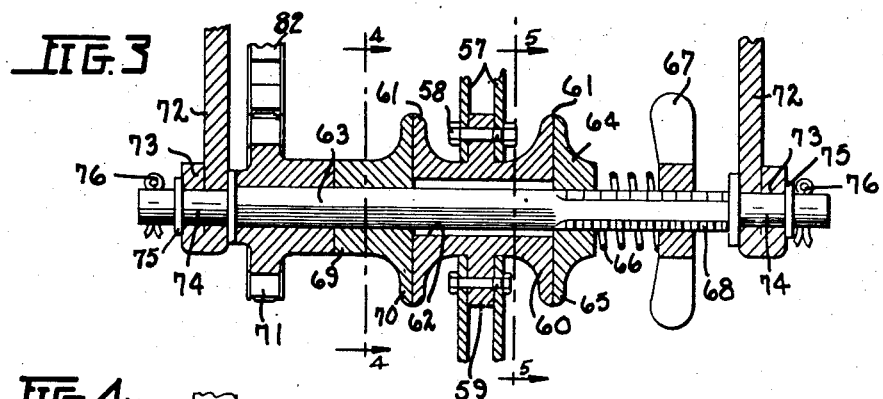
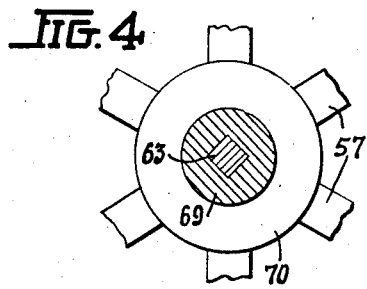
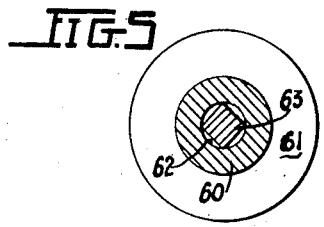
INVENTOR
ERNST E. ENGLUND
BY
ATTORNEYS Oct. 17, 1944.  E. E. ENGLUND  2,360,319
SEED PLANTER
Original Filed Dec. 26, 1941   4 Sheets-Sheet 4
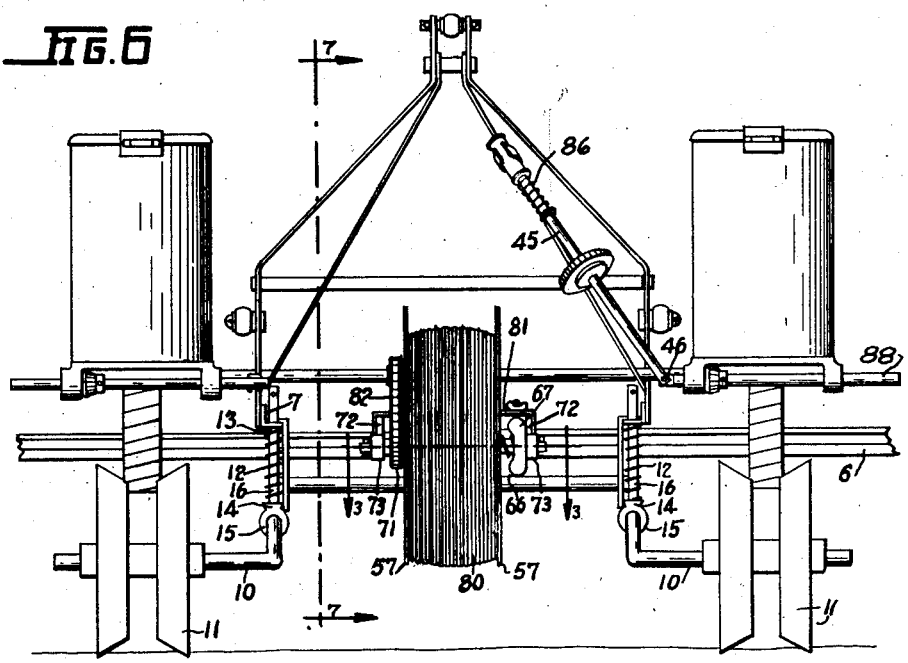
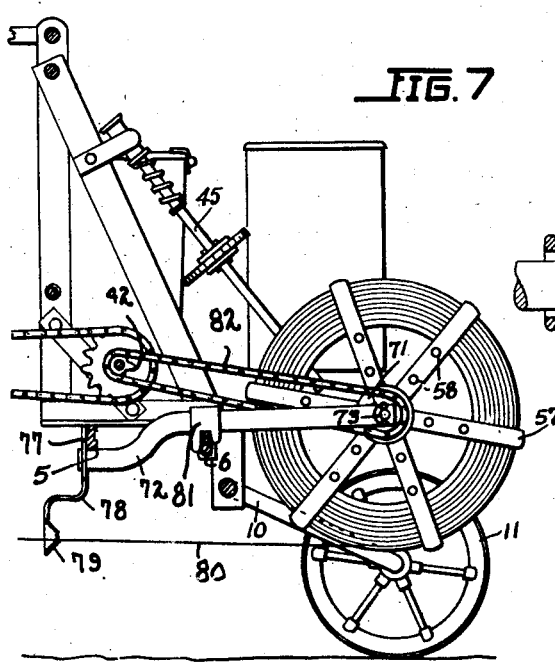
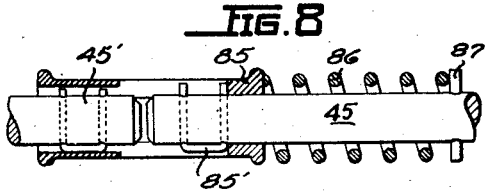
INVENTOR
ERNST E. ENGLUND
ATTORNEYS Patented Oct. 17, 1944

2,360,319

UNITED STATES PATENT OFFICE 2,360,319

SEED PLANTER

Ernst E. Englund, Bellevue, Ohio, assignor to The Ohio Cultivator Co., Bellevue, Ohio, a corporation of Ohio Original application December 26, 1941, Serial No. 424,440. Divided and this application August 7, 1942, Serial No. 453,962

5 Claims. (Cl. 111—44)

The present invention relates to farm machinery, and more especially to corn planters.

This application is a division of my application Ser. No. 424,440 filed Dec. 26, 1941 and entitled "Seed planter."

Corn planters of the type prior to this invention are quite bulky in size, due in no small part to the fact that the large check wire reel is carried at one side of the planter, thus materially increasing its width. Moreover, in these earlier machines it has been the practice to obtain the drive for the corn and fertilizer hoppers from ground wheels which usually extend rearwardly from the machine and thus materially increase the length and bulk of the machine in that direction. There are many other disadvantages in these machines, for example, in the case of the check wire reel there is no practical way in which the speed of the reel can be adjusted to accommodate the increase or decrease of pull when the check wire is being wound on the reel or paid off the reel. And the absence of this adjustment may cause undue strain to be placed on the check wire or cause the wire to be loosely wound on the reel, depending on the specific winding operation.

In most types of earlier planters the changeover of the corn feeding mechanism from check to hill, or to the drill type of planting, is often of a complicated nature and as such may not be satisfactorily performed by the average farmer. Moreover, in the same connection, in earlier corn planters there is often no provision made by which the corn is prevented from being dropped during the time that the planter is moving across the field at the end of its run going from one pair of planted rows to the next pair. It will be understood that the corn which is dropped during this movement of the planter is most likely wasted because the dropped corn is placed at the end of the field, where it is generally impossible to cultivate. The system of scoring or marking for the next double row of planting has not been altogether satisfactory in these earlier planters as the depth of the mark is not adjustable by the driver to suit the conditions of the terrain, but instead is determined by the depth to which a marking wheel sinks into the ground, due to its own weight. Obviously under these conditions, if the ground were hard, the wheel would not make as deep a mark as if the ground were soft, so that it might be impossible for the operator of the planter to see the marked line which determines the next two rows for planting.

The primary object of the invention is to provide an improved corn planter, and more especially to introduce a large number of improved features in the planter which all cooperate together to provide a machine that not only operates efficiently and economically by way of planting corn, but also may be regulated and controlled by the operator as to many of its functions so as to obtain the optimum planting results.

Another object is to provide an improved planter in which the bulky check wire reel is removed from the side of the machine and placed directly in the middle of the machine, where it occupies a balanced position and where it may be readily actuated from the main source of mechanical power, which in the present instance is assumed to be a farm tractor. This object is attained, in brief, by adapting the drive shaft of the fertilizer feed to be broken at the proper position, and mounting the main support wheels of the planter on a U-shaped shaft, all of which permits the placement of the wire reel at the center of the machine where it may be actuated by a suitable sprocket and chain arrangement connected directly to the tractor. An improved form of friction clutch is employed in connection with the wire reel, by which the necessary amount of slippage may be introduced at the reel in case the latter is being turned to take up the check wire.

The invention will be better understood when the drawings are studied in connection with the following description.

In the drawings:

Figure 2 is a plan view looking down on top of the improved planter.

Figure 3 is a longitudinal sectional view of a friction clutch which is employed in connection with the wire reel. This view is a section taken along the line 3—3 in Figure 6.

Figure 1:
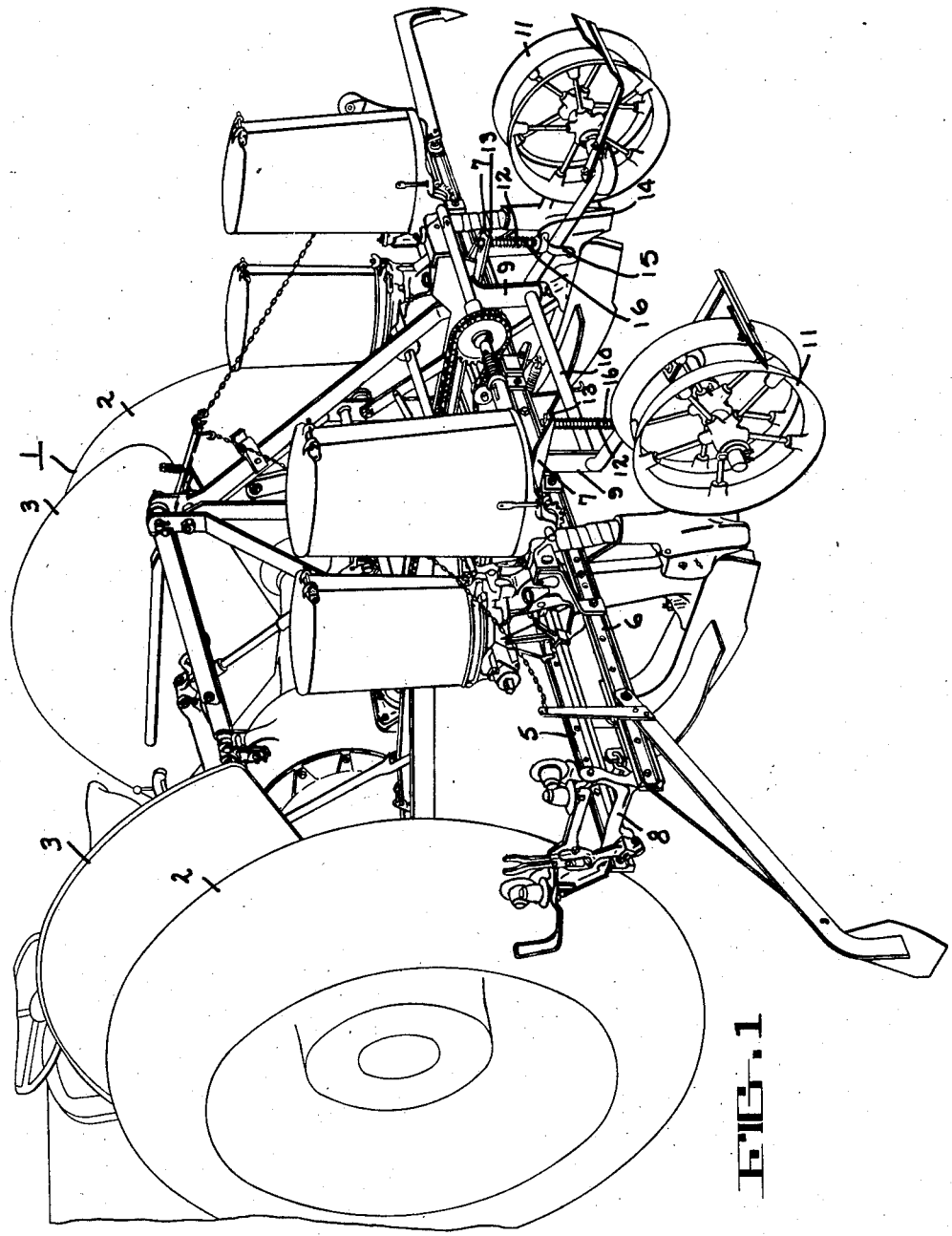
Figure 1 is a perspective view of the entire improved planter, together with as much of the tractor as is necessary to show the mechanical connection between the tractor and the planter.

Figures 4 and 5 are transverse sectional views cut across the friction clutch shown in Figure 5, and taken at the lines 4—4 and 5—5, respectively, in that figure.

Figure 6 is a view looking toward the rear of the planter when the check wire reel has been placed in position and is in the act either of taking up or paying out the check wire.

Figure 7 is a view taken along the line 7—7 in Figure 6, looking in the direction of the arrows, where most of the parts will be seen in elevation.

Figure 8 is a small detailed sectional view of a spring-pressed coupling which is used for making and breaking the mechanical connection between the fertilizer feed shaft and its drive shaft when the wire reel is mounted in position.

*General description of planter framework*

As shown more particularly in Figure 1, the planter is adapted to be drawn over the field by any suitable form of tractor, generally designated 1, and preferably provided with heavy traction tires 2, inside mud guards 3 and a rear axle differential. The planter is detachably connected to the tractor at the differential housing by means of a suitable form of rigid hitch.

The horizontal framework of the planter in general comprises a pair of spaced U-shaped structural members 5, 6, extending transversely of the machine, together with a pair of heavy angle-iron pieces 7 which extend across the members 5 and 6 preferably at positions where the greatest load is applied, which would normally be directly over the ground wheels. There is also a third angle iron element which extends between the structural members 5, 6 at a position which corresponds with the central longitudinal axis of the planter. The outermost ends of the members 5, 6 are additionally spanned by rigid bars 8 which carry standard types of pulley holders and tripping catches which are employed in connection with the check wire planting operation. Depending downwardly from the structural member 6 and at positions near the transverse angle irons 7, there is a pair of spaced brackets 9 which serve as hangers for a U-shaped shaft 10 which carries at its ends a pair of tapered ground wheels 11. These ground wheels serve to support the rear end of the planter and in addition serve to cover up the seed corn after it has been planted.

In order to provide for unevenness of terrain, compression springs 12 may be inserted between ledges 13 extending rearwardly of the frame and carried in cups 14 which are secured by a yoke 15 to the U-shaped shaft 10. A rod 16, may be encased by each spring in order to maintain rigidity of the planter frame in the horizontal direction. Thus the frame is resiliently supported at the rear by the springs 12, these springs serving to rotate the shaft 10 until the wheels 11 contact the ground. The front end of the rectangular framework is secured to the differential housing of the tractor preferably through a triangularly shaped hitch, and the main purpose of this hitch is to permit the frame of the planter to be swingably elevated when necessary so as to remove the wheels 11 from the ground.

*Check wire reel mechanism*

It has been stated hereinbefore that in the prior machines it is customary to place the wire reel at one side of the machine, but such an arrangement necessarily adds to the cumbersomeness of the apparatus as a whole and in addition tends to introduce certain unbalancing forces, due to the great weight of the wire reel. It will be understood that this wire reel is necessary to accommodate the so-called "check wire" by which uniform spacings are obtained between each charge of the seed which is deposited on the ground, in the manner to be described hereinafter. Immediately before the planting operation the check wire is paid out from the reel and staked to the ground, and after the planting operation the wire is taken up on the reel preparatory to being laid out for the next row of planting. When the wire is being paid out the diameter of the wire drum is continually getting smaller so that if the reel were power-driven at a constant speed and the tractor were moved over the ground at a constant speed, regardless of the instantaneus size of the wire reel, a great deal of slack would be bound to be introduced at the beginning of the unwinding operation and this slackness would change to extreme tightness during the last few turns of the winding reel. The opposite would be true during the winding or taking-up operation in that at the start of the winding operation considerable slackness in the wire may develop because the diameter of the wire drum at this time would be fairly small, but as the reel is being turned during the last part of the winding operation a severe tightness or drag would be produced, due to the greatly increased size of the wire drum.

In accordance with my invention, there is provided a slack-accommodating mechanism by which, even though the reel is power-driven at a constant speed throughout the winding and unwinding operations, nevertheless a constant drag is exercised on the wire. The mechanism by which this is attained has been shown in Figures 3, 4 and 5. The reel itself may comprise a number of (six as illustrated) radially extending ribs which take a general Y-shape, and which are preferably formed of two outwardly bent bars 57 which are spaced a short distance apart at their inner ends and bolted together as indicated at 58 (Figure 3). These bars are positioned on opposite sides of an annular flange 59 which forms part of a sleeve 60 having a flared portion at each end indicated at 61. The sleeve 60 is provided with a central bore 62, this bore having a diameter sufficiently large to permit the sleeve to run freely on the shaft 63. This shaft has a general rectangular configuration, as shown in Figure 4, so that the bore 62 is somewhat larger than the diagonal dimension of the shaft.

To the right of the sleeve 60 there is a heavy circular plate 64 having an enlarged flanged portion 65 directly abutting the portion 61 of the sleeve 60. The plate 64 is keyed or in any other manner fixedly secured to the square shaft 63, and abutting the outer face of the plate there is a compression spring 66 against which bears a relatively large wing nut 67. The latter is provided with a threaded bore which engages the threads 68 provided at the right-hand end of the shaft 63. This shaft may, if desired, be turned down to a circular configuration for the distance over which the wing nut 67 rides in order more readily to provide the necessary threads. By turning the nut 67 in such a way as to apply more compression to the spring 66, the abutting surfaces 61, 64 are brought together with greater pressure and therefore with increased friction. There is a sleeve somewhat similar to the plate 64 but of greater length positioned in abutting relation to the left-hand surface of the centrally disposed sleeve 60.

The sleeve 69 has a flanged portion 70 of a diameter similar to the portion 61 of the central sleeve, and next to the sleeve 69 the shaft 63 carries a sprocket wheel 71. The sleeve 69 and the sprocket 71 are fixedly secured to the shaft by utilizing bores of rectangular configuration which snugly receive the square shaft 63. The latter is detachably supported in position on the planter between a pair of brackets 72 which extend to the rear from any suitable position on the framework, these brackets being provided with journals 73 for accommodating circular end portions 74 of the shaft. In order to reduce friction at the brackets 72 as much as possible, washers 75 may be employed on each side of the bracket and the shaft, held within the brackets by means of cotter pins 76. The specific manner in which the brackets 72 are secured to the planter framework is shown in Figure 7.

It will be noted that the inner end of each bracket is given an S-shape, and the extreme end of each bracket fits within a slotted opening formed in a plate 77 which is secured to the structural member 5. The plate terminates in a downwardly extending angularly shaped portion 78 provided with a slot 79 through which the check wire 80 may pass toward or away from the reel. The plate portion 78, therefore, serves as a guide for the wire as it is being taken up. At a position approximately intermediate its length each bracket rests on top of the structural member 6, and is held in position by a slotted yoke member 81. Thus the weight of the reel and wire wound thereon tends to move each bracket 72 about the upper surface of the structural member 6 as a fulcrum, but is restrained in this movement due to the fact that the left-hand end (Figure 7) of the bracket abuts the under side of the structural member 5. The brackets 72 therefore can be readily placed in position, and notwithstanding the instant detachment of these brackets the latter are rigidly held in position during the reeling and unreeling operations. For driving the wire reel a chain 82 is passed over the sprocket 71 (Figure 3), this chain engaging the sprocket 42 on the seed hopper shaft. It is apparent that a rotary movement is communicated to the wire reel through the bars 57 due to the friction between the flanged portions 70, 61 and 61, 65 because the sleeves 69 and 64 are, in effect, keyed to the shaft.

Assume that the check wire is being paid out from the reel and the sprocket 71 is being rotated at a predetermined rate. It is apparent that if this rate were an average speed the peripheral surface of the reel would be moved so fast as to drop the wire at a faster rate than could be accommodated by the actual movement of the planter over the ground. It is therefore necessary at this time to decrease the rotary movement of the reel, and this may be readily done by turning the nut 67 in such a direction as to reduce the friction between the flanged surfaces 70, 61 and 61, 65, thereby permitting a certain amount of slippage to be introduced at the sleeve 60 which carries the reel. Again, when the end of the paying operation is approached it is entirely possible that the planter is traveling at a faster speed than that at which the wire is unwound from the reel. In this case tension may be introduced into the wire sufficient to break the wire. Accordingly, at this time it may be desirable to rotate the nut 67 in such a direction as to increase the friction between the driving surface 70 and the driven surface 61, also between the driving surface 65 and the driven surface 61 to cause the reel to speed up. It is therefore possible to regulate the speed of the reel by simply turning the nut 67 one way or the other and thus to accommodate the changes in the peripheral speed at the surface of the reel where the wire is either being paid out or taken up. Fig. 8 shows a section of the drive shaft 45' and the fertilizer feed shaft 45 with the spring pressed coupling for making and breaking the mechanical connection between these shafts. Such coupling comprises a sleeve 85 slidable on the two shaft ends, which sleeve is pressed by the spring 86, the latter being confined between the sleeve 85 and a pin 87 rigidly secured to the shaft 45. The sleeve 85 is limited in its movement under the stress of the spring by a U-shaped staple 85' acting as a stop. The two shafts are shown coupled together in Fig. 8, and may be uncoupled by sliding the sleeve 85 to the right until the sleeve passes beyond the end of the shaft 45', thus uncoupling the shafts from each other. The lower end of the shaft 45 is connected by a swivel 46 to the shaft 88 which operates the fertilizer hopper.

It is apparent that after the wire has been laid in its proper position on the ground and staked down, the next step is to run the planter over its proper course along the field simultaneously to plant and fertilize the corn kernels. Thus it is necessary that the fertilizer feed shaft 45 be restored to its proper position in order to actuate the fertilizer hoppers. The reel is then removed from its position by detaching the brackets 72 from the plate 77, after which the shaft 45 may be rotated at the swivel 46 and connected to the remaining portion of the shaft by means of the spring-pressed coupling shown in Figure 8, and in the manner described hereinbefore. The shaft 45 is, of course, again broken at the swivel in order to reinsert the winding reel at the conclusion of a row-planting operation and in order to re-lay the check wire preparatory to a new planting operation. It will be noted that when the check wire reel is in the position shown in Figure 6 the reel is symmetrically positioned with respect to the ground wheels 11 so that the weight of the reel and the contained check wire is carried equally by each wheel. Moreover, the central position of the reel assists the operator in observing the manner in which the wire is either being laid down on the ground or being taken up off the ground, so that if necessary the tractor may be instantly stopped when occasion requires. The central disposition of the reel lends increased compactness to the corn planter.

It will be understood that I desire to comprehend within my invention such modifications as come within the scope of the claims and the invention.

Having thus fully described my invention, what I claim as new and desire to secure by Letters Patent, is:

1. A planter comprising a pair of seed hoppers and a pair of fertilizer hoppers, a power shaft connected between said fertilizer hoppers for actuating the same, and a check wire reel positioned between said fertilizer hoppers for controlling the rate of feed of the seed hoppers, said shaft being temporarily broken to accommodate said reel.

2. A planter comprising a pair of seed-feeding hoppers and a pair of fertilizer-feeding hoppers, a power shaft connected between said fertilizer hoppers for actuating the same, and a check wire reel positioned between said fertilizer hoppers, said shaft being temporarily broken to accommodate said reel and said hoppers being carried on framework which is mounted on a pair of ground wheels, said reel being positioned between two frame members which are detachably mounted on the framework of the planter.

3. A planter mounted on a frame and adapted to be drawn by a power driven vehicle, said frame being mounted at one end on the vehicle and at the other end being carried on wheels, a U-shaped shaft for said wheels, said planter comprising a pair of seed hoppers and a pair of fertilizer hoppers, a power shaft connected between said fertilizer hoppers for actuating the same, and a check wire reel positioned between said fertilizer hoppers and rotatably mounted between the legs of the U-shaped shaft, said power shaft being temporarily broken to accommodate said reel.

4. A planter mounted on a frame and adapted to be drawn by a power driven vehicle, said frame being mounted at one end on the vehicle and at the other end being carried on ground wheels, a U-shaped shaft for said wheels, said planter comprising a pair of seed-feeding hoppers and a pair of fertilizer-feeding hoppers, a power shaft connected between said fertilizer hoppers for actuating the same and a check wire reel positioned between said fertilizer hoppers and between two frame members which are detachably mounted on the framework of the planter, said reel being also rotatably mounted between the legs of the U-shaped shaft, said power shaft being temporarily broken to accommodate said reel.

5. A planter comprising a pair of seed hoppers and a pair of fertilizer hoppers, a power shaft connected between said fertilizer hoppers for actuating the same, a check wire reel positioned between said fertilizer hoppers for controlling the rate of feed of the seed hoppers, a friction drive for said reel, means for controlling the amount of friction drive at the reel in order to regulate the drag and slack on the check wire depending on whether the wire is taken up or paid out, said friction drive comprising a power driven shaft and a pair of spaced flanged members secured to the driven shaft, a hub carrying said reel and positioned between said members, said hub being loosely mounted on the driven shaft, said power shaft being temporarily broken to accommodate said reel, and means including a spring for pressing the flanged members against said hub to transmit rotary power thereto from the driven shaft.

ERNST E. ENGLUND.